US006563973B1

(12) United States Patent
Caracci et al.

(10) Patent No.: US 6,563,973 B1
(45) Date of Patent: May 13, 2003

(54) LOW-INDEX WAVEGUIDE LIQUID CRYSTAL CROSS-CONNECT

(75) Inventors: Stephen J. Caracci, Elmira, NY (US); Thomas M. Leslie, Horseheads, NY (US); Robert G. Lindquist, Elmira, NY (US); Rui-Qing Ma, Painted Post, NY (US); James V. Suggs, Corning, NY (US)

(73) Assignee: Corning Incorporated, Corning, NY (US)

( * ) Notice: Subject to any disclaimer, the term of this patent is extended or adjusted under 35 U.S.C. 154(b) by 319 days.

(21) Appl. No.: 09/604,039

(22) Filed: Jun. 27, 2000

(51) Int. Cl.[7] ............................. G02B 6/35; G02F 1/13
(52) U.S. Cl. ............................. 385/17; 385/18; 385/40; 349/196
(58) Field of Search ................... 349/196, 197; 385/16–18, 14, 11, 40, 44, 45, 4, 8; 359/495, 290, 833

(56) References Cited

U.S. PATENT DOCUMENTS

| 3,963,310 A | * | 6/1976 | Giallorenzi et al. ........ 349/196 |
| 4,201,442 A | | 5/1980 | McMahon et al. |
| 4,278,327 A | | 7/1981 | McMahon et al. |
| 4,720,172 A | | 1/1988 | Baker |
| 4,828,362 A | | 5/1989 | Skinner et al. |
| 5,347,377 A | * | 9/1994 | Revelli et al. ............. 349/193 |
| 5,841,500 A | * | 11/1998 | Patel ........................ 349/141 |
| 6,414,803 B1 | * | 7/2002 | Pan et al. .................. 359/831 |
| 6,424,755 B1 | * | 7/2002 | Clapp ........................ 385/3 |

FOREIGN PATENT DOCUMENTS

JP  53-6058 A  * 1/1978

* cited by examiner

*Primary Examiner*—Rodney Bovernick
*Assistant Examiner*—Mike Stahl
(74) *Attorney, Agent, or Firm*—Gregory V. Bean (57) ABSTRACT

A non-blocking N×N cross-connect is provided that has an array of liquid crystal (LC) switches in a grid of planar optical waveguides within a light optical circuit (LOC). LC-filled trenches are used in a planar optical waveguide and each trench provides the functionality of a waveguide polarization splitter, a transverse electric (TE) switch cross-point, a transverse magnetic (TM) switch cross-point, or a waveguide polarization combiner. The planar optical waveguide has a refractive index substantially equal to the lowest index of refraction of the LC material. By combining these elements, a cross-connect system is fabricated. Also disclosed is a dynamically adjustable prism constructed with a liquid crystal material.

15 Claims, 10 Drawing Sheets

LOW-INDEX WAVEGUIDE LIQUID CRYSTAL CROSS-CONNECT

BACKGROUND OF THE INVENTION

1. Field of the Invention

The present invention relates in general to optical switching devices. More particularly, the present invention relates to a liquid crystal cross-connect for an optical waveguide and to optical prisms.

2. Technical Background

One of the current trends in telecommunications is the use of optical fibers in place of the more conventional transmission media. One advantage of optical fibers is their larger available bandwidth handling ability that provides the capability to convey larger quantities of information for a substantial number of subscribers via a media of considerably smaller size. Further, because lightwaves are shorter than microwaves, for example, a considerable reduction in component size is possible. As a result, a reduction in material, manufacturing, and packaging costs is achieved. Moreover, optical fibers do not emit electromagnetic or radio frequency radiation of any consequence and, hence, have negligible impact on the surrounding environment. As an additional advantage, optical fibers are much less sensitive to extraneous radio frequency emissions from surrounding devices and systems. With the advent of optical fiber networks, flexible switching devices are needed to direct light signals between fibers to all-optical domain fiber networks. Commonly assigned U.S. patent application Ser. No. 09/431,430, entitled "LIQUID CRYSTAL PLANAR NON-BLOCKING N×N CROSS-CONNECT," and filed on Nov. 1, 1999 on behalf of Thomas M. Leslie et al. discloses a non-blocking N×N cross-connect having an array of liquid crystal (LC) switches in a grid of planar optical waveguides within a light optical circuit (LOC). The disclosed LC switches include rectangular trenches or canals formed in a planar optical waveguide that are filled with an LC material. The various LC switches disclosed can function as a waveguide polarization splitter, a transverse electric (TE) switch cross-point, a transverse magnetic (TM) switch cross-point, a waveguide polarization combiner, a filter, variable optical attenuator, or a signal splitter. The disclosed cross-connect system is formed by combining these elements. The disclosed LC switches can be electrically addressed to create an index change that can either match the waveguide conditions or create a total internal reflection condition.

Figure 1:
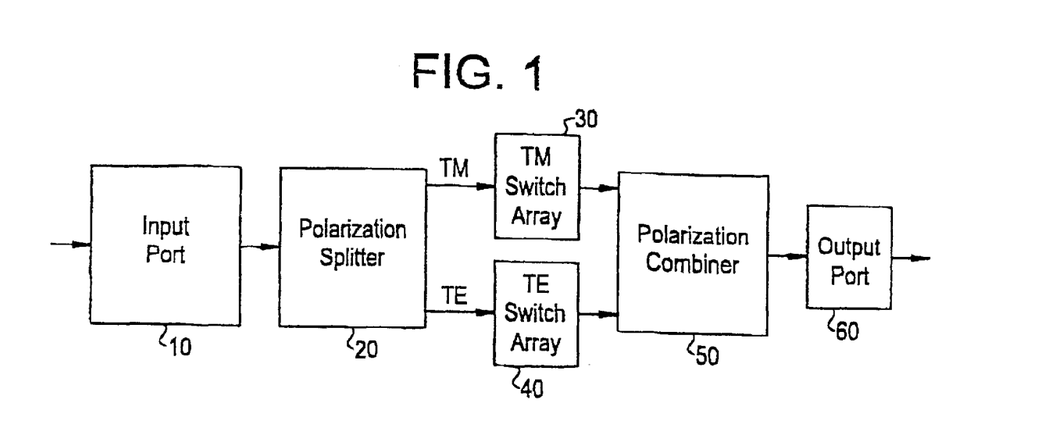
FIG. 1 is a block diagram showing an exemplary cross-connect system in accordance with the invention disclosed in the above-identified U.S. patent application Ser. No. 09/431,430.

FIG. 1 shows an example of the cross-connect system disclosed in the above U.S. patent application Ser. No. 09/431430 the disclosure of which is incorporated by reference herein. The cross-connect system includes an input port 10, a polarization splitter 20, a TM switch array 30, a TE switch array 40, a polarization combiner 50, and an output port 60. The input port 10 is a linear array of planar waveguides to which an array of fibers can be pigtailed. Similar to the input port 10, the output port 60 is a linear array of planar waveguides to which an array of fibers can be pigtailed. Light from the fibers enters the input port 10 and is passed to the polarization splitter 20.

Figure 2:
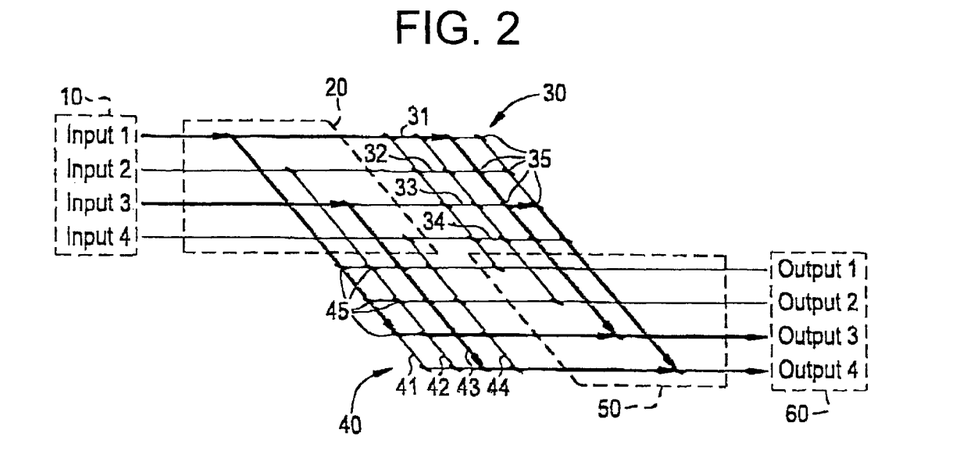
FIG. 2 is a schematic diagram showing a more detailed cross-connect system of FIG. 1 with the exemplary cross-connect being a 4×4 cross-connect.

FIG. 2 shows a more detailed schematic diagram of the cross-connect system shown in FIG. 1 with the exemplary cross-connect being a 4×4 cross-connect. The polarization splitter 20, the switching arrays 30, 40, and polarization combiner 50 are disclosed in the above U.S. patent application Ser. No. 09/431,430 as being formed with the same fundamental LC switch element, which is an LC-filled trench or canal in a planar waveguide, as generally shown in FIGS. 3A and 3B.

The LC switches disclosed in the above U.S. patent application Ser. No. 09/431,430 are polarization dependent and thus, the TE and TM waves are handled separately. Light from the input port 10 enters the polarization splitter 20, which separates the TE and TM waves by reflecting the TE waves to the TE switch array 40 while passing the TM waves to the TM switch array 30. Each switch array 30, 40 has a plurality of LC switch elements 35, 45 in each path 31–34 and 41–44, respectively. A single LC switch element in each path is set to a reflecting state to pass the light onto the polarization combiner 50. The path difference for the TE and TM waves is substantially identical. The polarization combiner 50 allows the TE wave to pass while reflecting the TM wave to recombine. Thus, the beams are recombined and passed to the appropriate path in the output port 60.

Figure 3A:
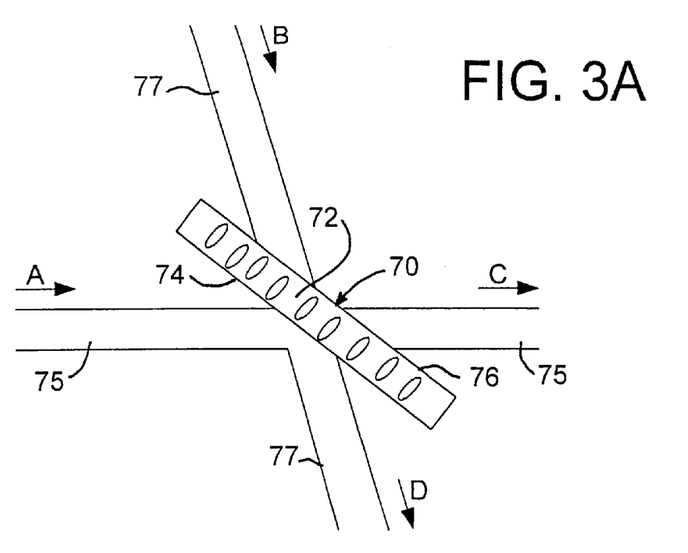
FIGS. 3A and 3B are top views of an LC-filled trench illustrating the orientation of the LC molecules in the trench without and with a voltage applied to an address electrode, respectively, as disclosed in the above-identified U.S. patent application Ser. No. 09/431,430.
Figure 3B:
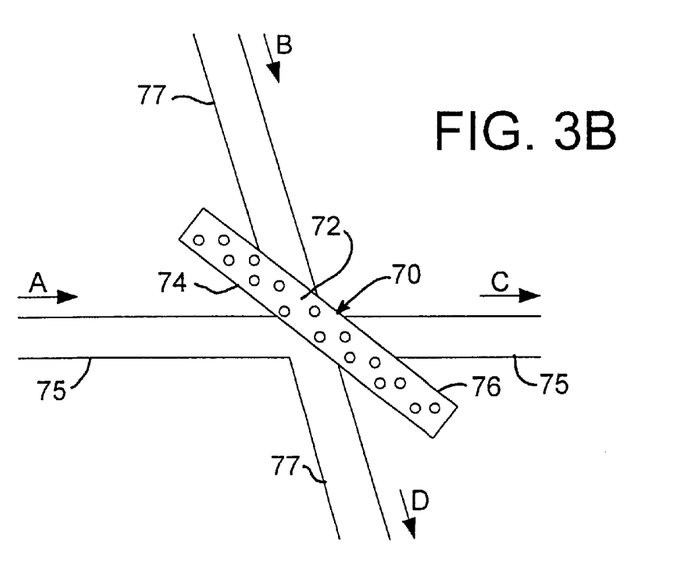

FIGS. 3A and 3B show a top view of an LC switch element as disclosed in the above U.S. patent application Ser. No. 09/431,430 in two different states. As shown in FIG. 3A, the LC switch element includes a trench 70 formed at the intersection of a first waveguide 75 and a second waveguide 77. The front sidewall 74 and rear sidewall 76 of trench 70 have an alignment layer disposed thereon and trench 70 is filled with an LC material 72. LC material 72 has a plurality of elongated molecules that align perpendicular to the alignment layers on surfaces 74 and 76 when no electric field is applied through the LC material. Thus, the molecules would be aligned as illustrated in FIG. 3A. As disclosed in the above U.S. Pat. No. 09/431,430, the waveguides 75 and 77 have a refractive index of approximately 1.7 while the ordinary refractive index $n_o$ of LC material 72 is approximately 1.5 and the extraordinary refractive index $n_e$ of LC material 72 is approximately between 1.6 to 1.8.

When a TM wave propagates through first waveguide 75 in the direction corresponding to arrow A in FIG. 3A and when the LC molecules are aligned as shown in FIG. 3A, the TM waves pass through trench 70 and continue to propagate along waveguide 75 in the direction indicated by arrow C. A TE wave, however, propagating in the direction indicated by arrow A along waveguide 75 couples directly into the ordinary ray in the LC material 72, which has an index of no (~1.5). This index is considerably lower than the effective refractive index of waveguide 75, thus resulting in total internal reflection at front surface 74 of trench 70. Thus, the TE wave is reflected into second waveguide 77 and propagates through that waveguide in the direction indicated by arrow D. Thus, if both TE waves and TM waves are concurrently propagating through waveguide 75 in direction A, the LC switch splits the TE and TM waves from one another while directing the TM wave through first waveguide 75 in the direction indicated by arrow C and transmitting the TE wave through second waveguide 77 in the direction indicated by arrow D. Conversely, if a TM wave is propagating through second waveguide 77 in the direction indicated by arrow B while a TE wave is concurrently propagating through first waveguide 75 in the direction indicated by arrow A, the LC switch functions as a beam combiner by allowing the TM wave to be transmitted through trench 70 and continue to propagate down second waveguide 77 in the direction indicated by arrow D while also redirecting the TE wave through second waveguide 77 in the direction indicated by arrow D.

Referring to FIG. 3B, the LC material 72 in trench 70 is illustrated in an alternate orientation, which would occur when a voltage is applied between two electrodes that are provided on the bottom of the trench and the top of the trench. When the voltage is applied, the molecules of LC material 72 align themselves in parallel with sidewalls 74 and 76 in a vertical orientation.

When the LC molecules are aligned as illustrated in FIG. 3B, a TM wave propagating through first waveguide 75 in the direction indicated by arrow A is reflected from the first surface 74 of trench 70 into second waveguide 77 in the direction indicated by Arrow D. A TE wave propagating through first waveguide 75 in the direction indicated by arrow A would propagate through the LC-filled trench 70 and continue to transmit along first waveguide 75 in the direction indicated by arrow C. The LC switch may thus also function as a polarization beam splitter and beam combiner in the same manner as indicated with respect to FIG. 3A with the exception that the TE and TM waves would be split and directed along different waveguides.

The liquid crystal switch shown in FIGS. 3A and 3B may also be used to selectively direct a light signal having a single polarization state to a different waveguide or allow the signal to continue to propagate through the same waveguide. For example, a TM wave will pass through the LC-filled trench 70 when propagating through first waveguide 75 in the direction A and exit the trench so as to continue to propagate along first waveguide 75 in the direction illustrated by arrow C. By then applying a voltage to the electrodes (not shown), the TM wave may be redirected to instead propagate through second waveguide 77 in the direction indicated by arrow D. A TE wave may similarly be directed along different waveguides by selectively applying a voltage across the LC switch electrodes.

While the LC switch shown in FIGS. 3A and 3B is effective for performing the functions described above, the structure utilizes optical waveguides having relatively high indices of refraction. Materials suitable for use as waveguides and having such high refractive indices (i.e., 1.7) are not available at the same cost that waveguides with relatively low indices of refraction (i.e., 1.5) are available. While it is desirable to replace the higher index waveguides with low index waveguides, one cannot simply replace the higher index material with a lower index material while still utilizing the construction shown in FIGS. 3A and 3B. Specifically, when a low index material is utilized, waves propagating through the waveguide and coupling to the extraordinary wave of LC material 72 would pass through first surface 74 of trench 70 and would be reflected off the inside of the rear surface 76. The angled front surface of the trench would cause further refraction of the light wave and much of the light wave would be lost rather than being properly redirected along second waveguide 77. Accordingly, there exists a need for an LC switch construction that is compatible with low index waveguides.

SUMMARY OF THE INVENTION

One aspect of the invention is to provide an optical device comprising first and second optical paths for propagating a light signal, wherein the second optical path intersects the first optical path at a cross-point; and a liquid crystal prism positioned in the first and second optical paths at the cross-point for directing at least a portion of the light signal from the first optical path to the second optical path.

Another aspect of the invention is to provide an optical cross-connect switch comprising a substrate; a plurality of optical waveguides provided on the substrate, wherein each of the waveguides intersects at least another one of the waveguides; and a plurality of liquid crystal prisms each disposed on the substrate at a position where a pair of the waveguides intersect. The liquid crystal prisms selectively redirect a light signal propagating through one of the pair of intersecting waveguides to the other of the pair of intersecting waveguides in response to an electrical signal.

Another aspect of the present invention is to provide an optical device for directing a light signal comprising a substrate; an optical waveguide disposed on the substrate; at least one first electrode disposed between the substrate and the optical waveguide; a liquid crystal prism formed in the optical waveguide; and a top plate connected to the substrate.

Another aspect of the present invention is to provide a dynamically adjustable optical prism comprising a prismatic-shaped structure having an input surface for receiving a light signal, two output surfaces, and two opposed surfaces. The prismatic-shaped structure includes a dynamic material disposed between the surfaces that changes optical states in response to an electrical signal to selectively direct the received light signal to exit through one of the two output surfaces. The dynamically adjustable prism further includes a pair of electrodes each disposed on a different one of the two opposed surfaces for applying the electrical signal to the dynamic material.

Another aspect of the present invention is to provide an optical device for directing a light signal comprising an optical waveguide, and a liquid crystal element formed in the optical waveguide. The liquid crystal element has an ordinary refractive index that is substantially equal to the refractive index of the optical waveguide and has an extraordinary refractive index that is greater than the refractive index of the optical waveguide.

Another aspect of the present invention is to provide a method of directing light comprising the steps of (a) providing a liquid crystal optical element having surfaces configured to function as a prism; (b) directing a light signal at a first one of the surfaces of the LC optical element; and (c) selectively changing the state of the LC optical element to cause the light signal to be directed from different surfaces of the LC element.

Another aspect of the invention is to provide a method of making an optical device comprising the steps of (a) providing a substrate; (b) forming a trench in the substrate having a shape of a prism; (c) dispensing an LC material in the trench; and (d) securing a cover over the LC-filled trench and a portion of the substrate.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention, which, together with their description serve to explain the principals and operation of the invention.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as shown in the drawings. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

The present invention is directed to a non-blocking N×N cross-connect having an array of LC switches in a grid of planar optical waveguides within a light optical circuit (LOC). The present invention is further directed to LC prisms that may be created by filling trenches formed in a planar optical waveguide with an LC material. The LC prisms function as dynamically adjustable prisms to selectively direct light signals along different optical paths in response to an electrical signal. Such LC prisms can provide the functionality of a waveguide polarization splitter, a TE switch cross-point, a TM switch cross-point, a waveguide polarization combiner, a filter, variable optical attenuator, or a signal splitter. By combining these functional elements, a cross-connect system can be fabricated. The LC prisms can be electrically addressed to create an index change that can either match the waveguide conditions or create a total internal reflection condition and thereby redirect an incident light beam.

Figure 4:
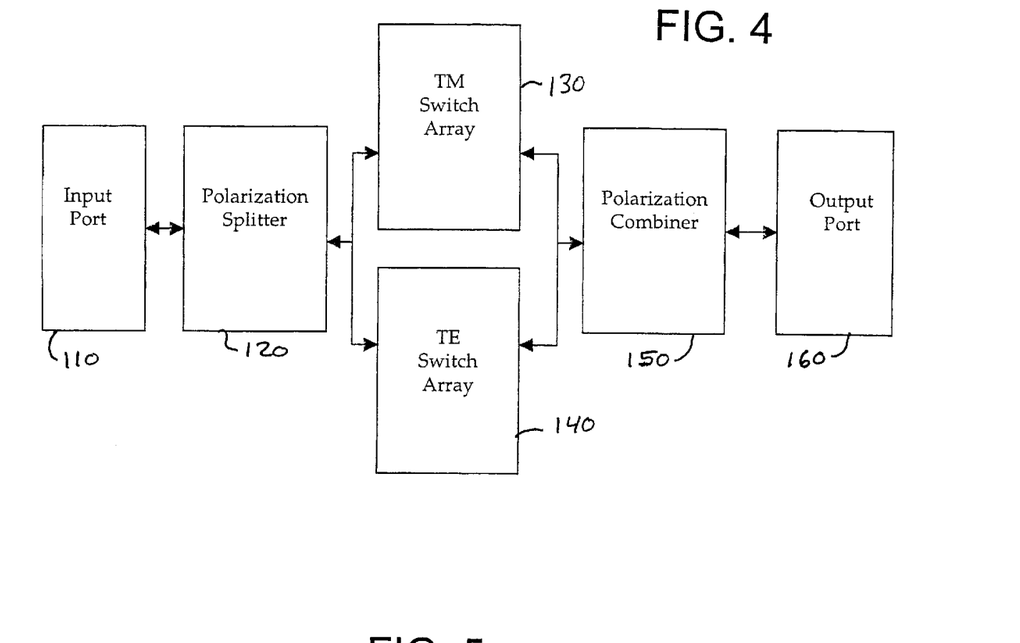
FIG. 4 is a block diagram showing an exemplary cross-connect system in accordance with the present invention.

FIG. 4 shows an exemplary cross-connect system in accordance with the present invention. The exemplary system comprises an input port 110, a polarization splitter 120, a TM switch array 130, a TE switch array 140, a polarization combiner 150, and an output port 160. The input port 110 is a linear array of planar waveguides to which an array of fibers can be pigtailed. The spacing between waveguides is determined by pigtailing capabilities. Light from the fibers enters the input port 10 and is passed to the polarization splitter 120. The polarization splitter separates light into its TM and TE components. The TM components are then passed to the TM switch array 130, and the TE components are passed to the TE switch array 140. As described in further detail below, the outputs of the switch arrays 130 and 140 are combined by the polarization combiner 150 and passed to the output port 160. Similar to the input port 110, the output port 160 is a linear array of planar waveguides to which an array of fibers can be pigtailed.

It should be noted that TM and TE are defined herein by convention at the LC trench interfaces, and not by waveguide convention.

Figure 5:
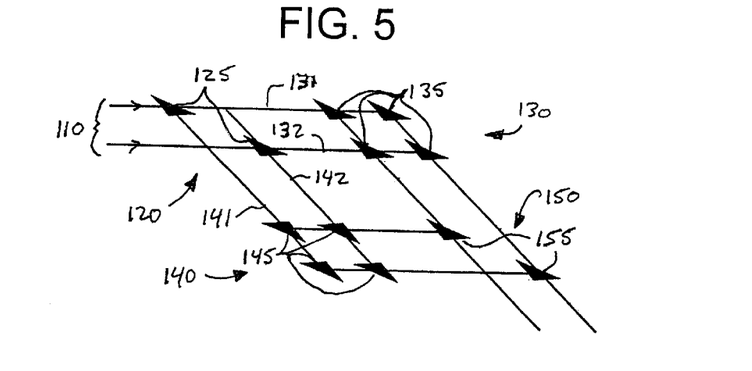
FIG. 5 is a schematic diagram showing a more detailed cross-connect system of FIG. 4 with the exemplary cross-connect being a 2×2 cross-connect.

FIG. 5 shows a more detailed cross-connect system of FIG. 4 with the exemplary cross-connect being a 2×2 cross-connect. Light from the input port 110 that enters the polarization splitter 120 is incident a pair of LC prisms 125 that reflect the TE waves to the TE switch array 140 while passing the TM waves to the TM switch array 130 as shown, for example, in FIG. 8 and described below. The switching arrays 130, 140 are preferably between about 50 and 500 μm center to center, and more preferably about 250 μm center to center. Each switch array 130, 140 has a plurality of LC prism switching elements 135, 145 in each path 131–132 and 141–142, respectively, as shown, for example, in FIGS. 10A, 10B, 11A, and 11B, as described below. A single switching element in each path is set to a reflecting state to pass the light onto the polarization combiner 150. It should be noted that the path difference for the TE and TM waves are substantially identical. The polarization combiner 150 includes a pair of LC prisms 155 that allow the TM wave to pass while reflecting the TE wave to recombine, as shown, for example, in FIG. 9, described below. Thus, the beams are recombined and passed to the appropriate path in the output port 160.

Figure 6:
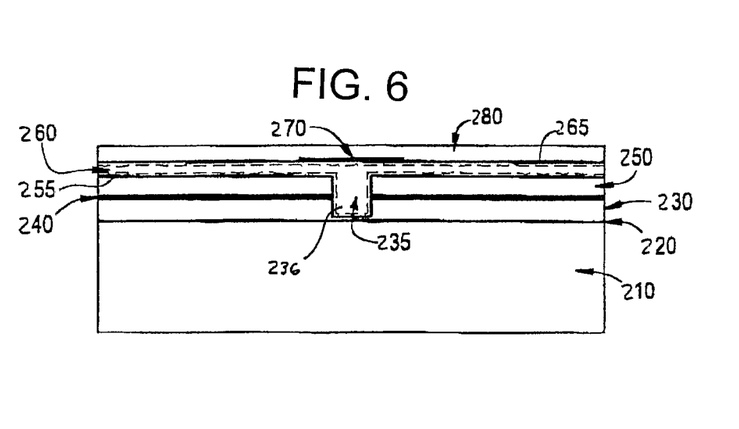
FIG. 6 shows a cross-sectional side view of an exemplary LC prism in a planar waveguide in accordance with the present invention.

The polarization splitter 120, the switching arrays 130, 140, and polarization combiner 150 are preferably formed within the same fundamental element, which is preferably an LC prism 235 that is formed as a prism-shaped LC-filled trench in a planar waveguide, as shown in FIG. 6. An LC film 260 is sandwiched between two plates or substrates having patterned deposited thin films thereon. The structure functions as the desired element depending on an applied voltage, as described below.

The bottom plate or substrate 210 on which the waveguide is patterned preferably has five deposited layers thereon. The first layer is a first electrode 220, such as a grounding electrode that comprises an unpatterned conductive coating such as gold, aluminum, or indium tin oxide. The grounding electrode can be either a single electrode or a segmented electrode. A cladding layer 230 is deposited on the first electrode 220, and comprises a cladding layer having a thickness between about 12 and 50 μm thick for the planar waveguide. A core layer 240 is deposited on the cladding layer to a thickness between about 4 and 10 μm. The layers 230 and 240 are etched or otherwise patterned to form prism-shaped trenches 236 that provide the grid structure of FIG. 5. A cladding layer 250, similar to the cladding layer 230, is formed above the patterned core layer 240 to a thickness between about 12 and 50 μm. As discussed further below, the trench is shaped to define a prism, and is preferably shaped as a triangle.

A first alignment layer 255 is disposed above the cladding layer 250 and in the trench 236 directly over the portion of the first electrode 220 that is exposed by the etching or patterning of layers 230 and 240. The alignment layer 255 comprises a thin copolymer layer or other material, such as an obliquely evaporated SiO, silane coupling agents, or a polymer to assist in homeotropic alignment of LC material in the LC layer 260. The alignment layer 255 is preferably deposited to a thickness of between one monolayer and about 100 nm. The alignment layer 255 should be thin enough to avoid creating an optical effect due to its refractive index. The liquid crystal layer 260 is then deposited over the first alignment layer 255 both in the trench 236 and over the cladding layer 250. The thickness of the liquid crystal material above the first alignment layer 255 is preferably less than about 25 μm. Any liquid crystal material can be used, including those from the nematic class (preferred) and the ferroelectric class. One liquid crystal material that can be used is EM Chemicals BL009, having a Δn of about 0.28. It should be noted that the larger the Δn for the LC material, the more preferable the material is for use with the system of the present invention. The index matching and the angles of the LC molecules are responsive to the Δn.

A second alignment layer 265 is disposed on the LC layer 260. The second alignment layer 265 is preferably substantially similar in composition and thickness to the alignment layer 255, although this does not have to be the case.

A top plate preferably has two deposited layers. A first plate layer is a second electrode, such as an address electrode layer 270 that comprises a patterned conductive coating such as gold, aluminum, or indium tin oxide. A second plate layer is a cover glass 280. The thickness of the layers 270 and 280 is not critical, as would be known by those skilled in the art, and each can have a thickness between about 0.3 and 300 μm or even greater. It should be noted that the first and second electrodes can act as the grounding and address electrodes, respectively, or the first and second electrodes can act as the address and grounding electrodes, respectively.

Figure 7A:
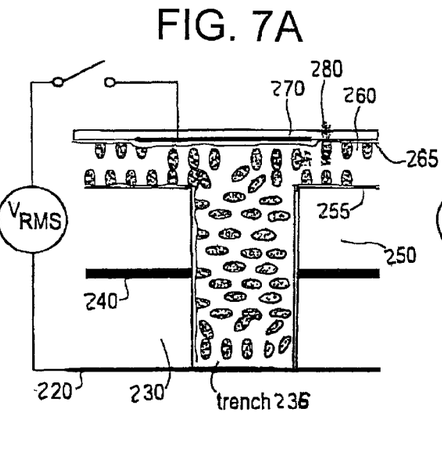
FIGS. 7A and 7B are cross-sectional side views of LC prisms in two different polarization states as constructed in accordance with the present invention.
Figure 7B:
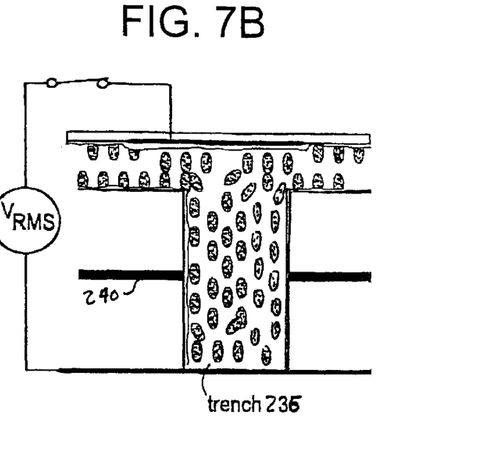

FIGS. 7A and 7B illustrate the orientation of the LC molecules of LC layer 260 in trench 236 without and with a voltage applied to the second electrode 270, respectively. With substantially no voltage applied, as shown in FIG. 7A, the LC molecules tend to align substantially perpendicular to any interface coated with a properly chosen first alignment layer. Therefore, the director axis inside the trench 235 lies in the plane of the waveguide fabric and perpendicular to the trench interface. When a sufficient voltage is applied to the address electrode, as shown in FIG. 7B, the LC molecules rotate to align with the electric field. In this case, the director axis lies substantially perpendicular to the substrate. A typical voltage that is sufficient to turn on the address electrode is between about 3 and 5 volts. The threshold voltage depends on the LC material being used and the distance between the electrodes. It should be noted that the higher the applied voltage above the threshold voltage, the faster the switch.

Because the birefringence of an LC material is typically on the order of about 0.1 to 0.3, the optical properties for the TE and TM guided modes are substantially different and can be significantly changed with an applied field. As described below, the LC prisms can be used for polarization splitting, TE and TM switching, polarization combining, signal splitting, and variable optical attenuating.

Figure 8:
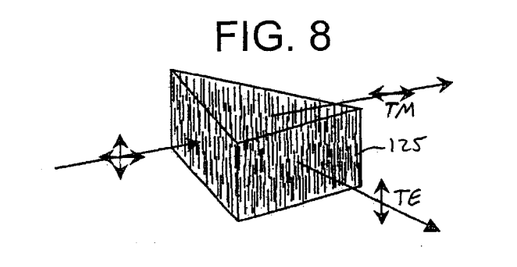
FIG. 8 is a perspective view of an LC prism of the present invention functioning as a polarization splitter.

An LC prism 235 utilized as a polarization splitting element 125 is shown in FIG. 8. The LC prism used as splitter 125 is shown with an electric field applied across the volume of the LC material so as to align the LC molecules perpendicular to the triangular facets in a similar orientation as illustrated in FIG. 7B. Since TE light is polarized parallel to the LC director, it experiences the extraordinary refractive index, $n_e$=1.7, and is reflected at the back surface (i.e., hypotenuse) of the LC prism triangle. TM light sees only the ordinary refractive index, $n_o$=1.5, and passes through LC prism 235 without refracting or reflecting.

Figure 9:
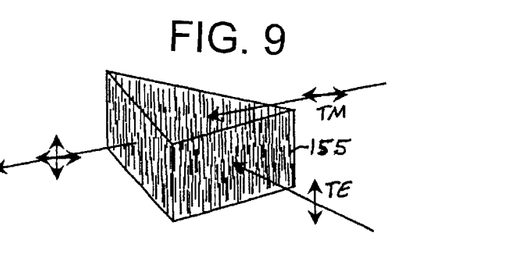
FIG. 9 is a perspective view of an LC prism of the present invention functioning as a polarization combiner.

FIG. 9 shows an LC prism used as a polarization combiner 155. The LC prism is shown with an electric field applied across the volume of the LC material to align the LC molecules perpendicular to the triangular facets in a similar orientation as illustrated in FIGS. 7B and 8. As shown, the TM light passes through combiner 155 without refracting or reflecting while TE light is reflected at the back surface of the LC prism triangle. Both the TE and TM light thus exit the same side of the triangular prism.

Figure 10A:
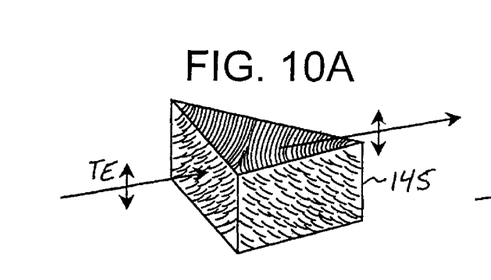
FIGS. 10A and 10B are perspective views of an LC prism of the present invention functioning as a TE switch as shown in its two different states.
Figure 10B:
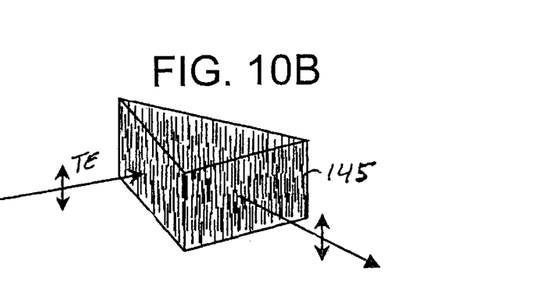

FIGS. 10A and 10B show an LC prism used as a TE switch 145. In FIG. 10A, the LC prism is shown with no electric field applied across the volume of the LC prism. When no electric field is applied, the LC molecules are homeotropically aligned parallel to the triangular facets in a similar orientation as illustrated in FIG. 7A. The TE polarized light sees only the ordinary refractive index no in this case, and passes through the LC prism. When switching is desired, a voltage is applied across the first and second electrodes and hence across the volume of the prism thereby rotating and aligning the LC molecules vertically in the same orientation as in FIGS. 7B, 8, and 9. Similar to the polarization splitter, the TE light reflects off the hypotenuse surface of the LC prism triangle causing the TE light to exit the LC prism through a different face than is shown in FIG. 10A.

Figure 11A:
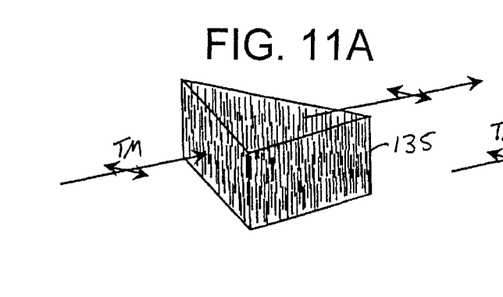
FIGS. 11A and 11B are perspective views of an LC prism of the present invention functioning as a TM switch as shown in its two different states.
Figure 11B:
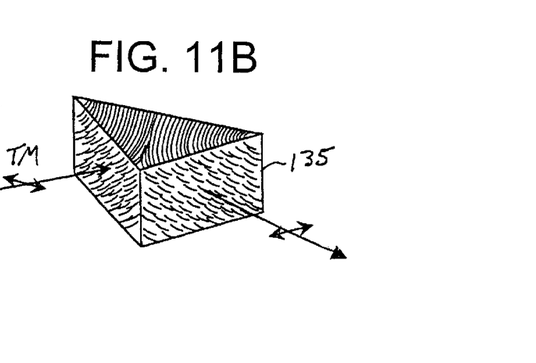

FIGS. 11A and 11B illustrate an LC prism used as a TM switch 135. FIG. 11A shows the TM switch 135 with an electric field applied across the volume of the LC prism in which case the LC molecules are aligned vertically in the same manner as shown in FIGS. 7B, 8, 9, and 10B. When in this state, TM light passes through switch 135 without refraction or reflection. FIG. 11B shows the TM switch 135 when no electric field is applied to the LC prism. In this state, the LC molecules are aligned perpendicular to the triangle surfaces and are thus aligned in the same manner as in FIGS. 7A and 10A. When in this state, TM light is reflected from the hypotenuse of the triangle and exits a different face of the triangle as shown in FIG. 11B.

As will be apparent to those skilled in the art, the polarization splitting elements 125 and polarization combining elements 155 are bi-directional. Similarly, TM and TE switches 135 and 145, respectively, are also bi-directional. Thus, light signals may be input through output ports 160 and exit from input ports 110.

It should also be noted that LC prisms used as polarization splitters 125 or combiners 155 need not include alignment layers, if electrodes are present, since it is perceived that they would not necessarily change states during use. Conversely, the alignment layers may be applied and the electrodes may be eliminated to maintain the LC molecules in a different alignment. Other than those optional modifications, the LC prisms constituting elements 125, 135, 145, and 155 may be identical. Two possible designs for the triangular LC prisms are described further below with reference to FIGS. 12–15.

When TE light enters an LC prism having an electric field applied across its volume as shown in FIG. 10B, and when TM light enters an LC prism with no electric field applied (as shown in FIG. 11B), the incident light encounters an effective refractive index ($n_{eff}$), which is a function of the angle between the incident wave vector and the director of the liquid crystal material. The effective refractive index $n_{eff}$ will have a value determined by:

$$n_{eff}(\Phi) = \left[\frac{n_o^2 n_e^2}{n_e^2 \cos^2(\Phi) + n_o^2 \sin^2(\Phi)}\right]^{1/2}$$

Thus, the larger acute angle θ of the triangle forming the LC prism must satisfy the following condition for total internal reflection to occur:

$$\beta_2 \geq Atn\left(\frac{n_c n_e}{n_0 \sqrt{n_e^2 - n_c^2}}\right)$$

The smaller the refractive index $n_c$ of the waveguides, the smaller the angle $\beta_2$. The value of 1.5 for $n_c$ gives a critical angle of 64.8°, while a value of 1.4 gives a critical value of 58.7°. When the above condition is met, the incident beam will be split into two polarizations with the TE wave exiting one surface of the triangle and the TM wave exiting another surface of the triangular prism.

Figure 12:
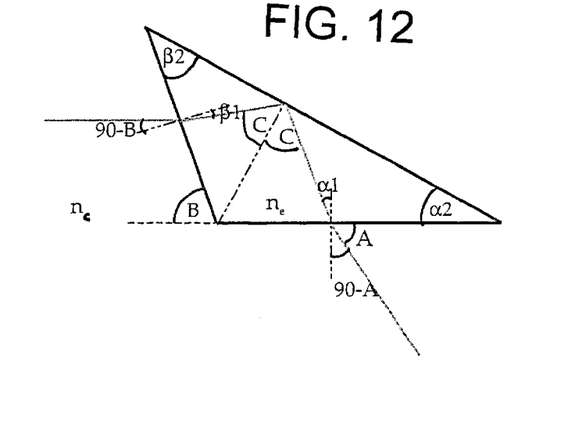
FIG. 12 is a top view of an LC prism constructed in accordance with a first embodiment of the present invention.

In designing the configuration of the triangular LC prisms, not only is it desirable to ensure that total internal reflection occurs for the appropriate polarization, but also the unguided distance $U_g$ the light travels within the LC prism should also be minimized. In a first exemplary design, which is shown in FIG. 12, one side of the triangle is fixed as horizontal. A is the angle between the oblique waveguide direction and the horizontal direction. B is the tilt angle of the surface of the triangle facing the horizontally arranged waveguide. C is the critical angle. With these designations, the following equations may be derived:

$n_c \sin(90-A) = n_e \sin \alpha 1$ $\alpha 2 = C - \alpha 1$ $n_c \sin(90-B) = n_e \sin \beta 1$ $\beta 2 = C - \beta 1$ $B = \alpha 2 + \beta 2$ These equations may be combined to yield:

$$2C - \arcsin\frac{n_c \cos B}{n_e} - \arcsin\frac{n_c \cos A}{n_e} - B = 0$$

When the width of the waveguide core is h, the unguided distance $U_g$ is the larger value of $U_{g1}$ and $U_{g2}$, where:

$U_{g1} = h/2[ctn(\alpha 2) - ctn(B)]$ $$U_{g2} = h\left(1 - \frac{\tan(B) - \tan(\alpha 2)}{2\tan(B) - \tan(\alpha 2)}\right)$$

Figure 13:
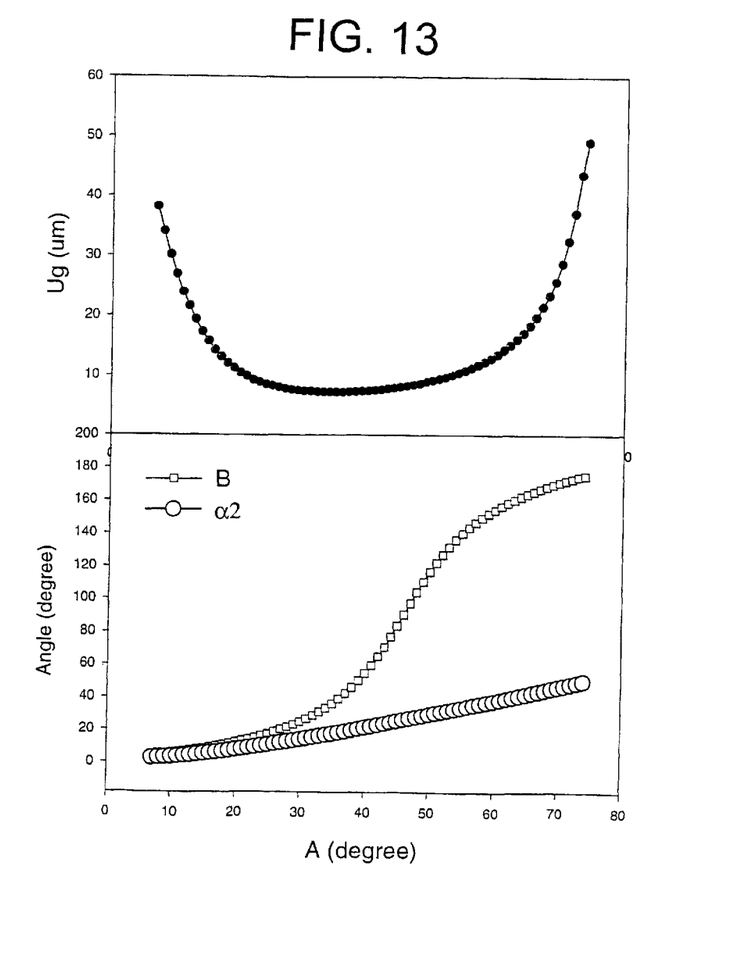
FIG. 13 is a graph of the unguided distance through an LC prism of the present invention and the relative angles defining the triangular LC prism as a function of the exit angle A of the light exiting one of the surfaces of the triangular LC prism.

The angles A and B corresponding to the minimum value of $U_g$ is the design that will give the least loss. The result of the calculation is shown in FIG. 13. The calculation is based on the following input parameters: $n_c = 1.5$, $n_3 = 1.7$, and C=63°. The minimum value of unguided distance $U_g$ is achieved when the angle between the two waveguides is 33°. The corresponding B and $\alpha 2$ are 25° and 15°, respectively. However, the unguided distance is reasonably small when the angle A is smaller than 50°.

Figure 14:
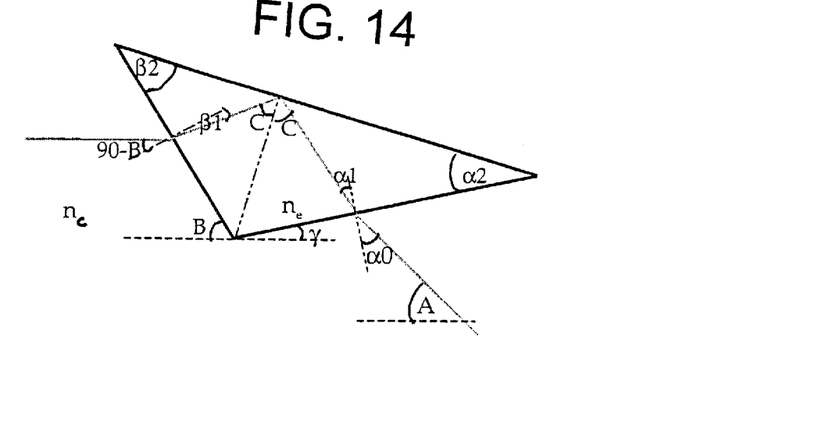
FIG. 14 is a top view of an LC prism constructed in accordance with a second embodiment of the present invention.

A second design is shown in FIG. 14. In this design, the side m of the triangle is free to rotate, the angle between the side m and the horizontal is defined as γ. A is the angle between the oblique waveguide direction and the horizontal direction. B is the tilt angle of the surface of the triangle facing the horizontal waveguide. C is the critical angle. With these designations, the following equations can be derived:

$n_c \sin(90-A-\gamma) = n_e \sin \alpha 1$ $\alpha 2 = C - \alpha 1$ $n_c \sin(90-B) = n_e \sin \beta 1$ $$\beta 2 = C - \beta 1$$

$$B + \gamma = \alpha 2 + \beta 2$$

These equations can be combined into the following equation:

$$2C - \arcsin\frac{n_c \cos B}{n_e} - \arcsin\frac{n_c \cos(A + \gamma)}{n_e} - B - \gamma = 0$$

When the width of the waveguide core is h, the unguided distance $U_g$ is:

$$U_g = h/2[ctn(\alpha 2 - \gamma) - ctn(B)]$$

Figure 15:
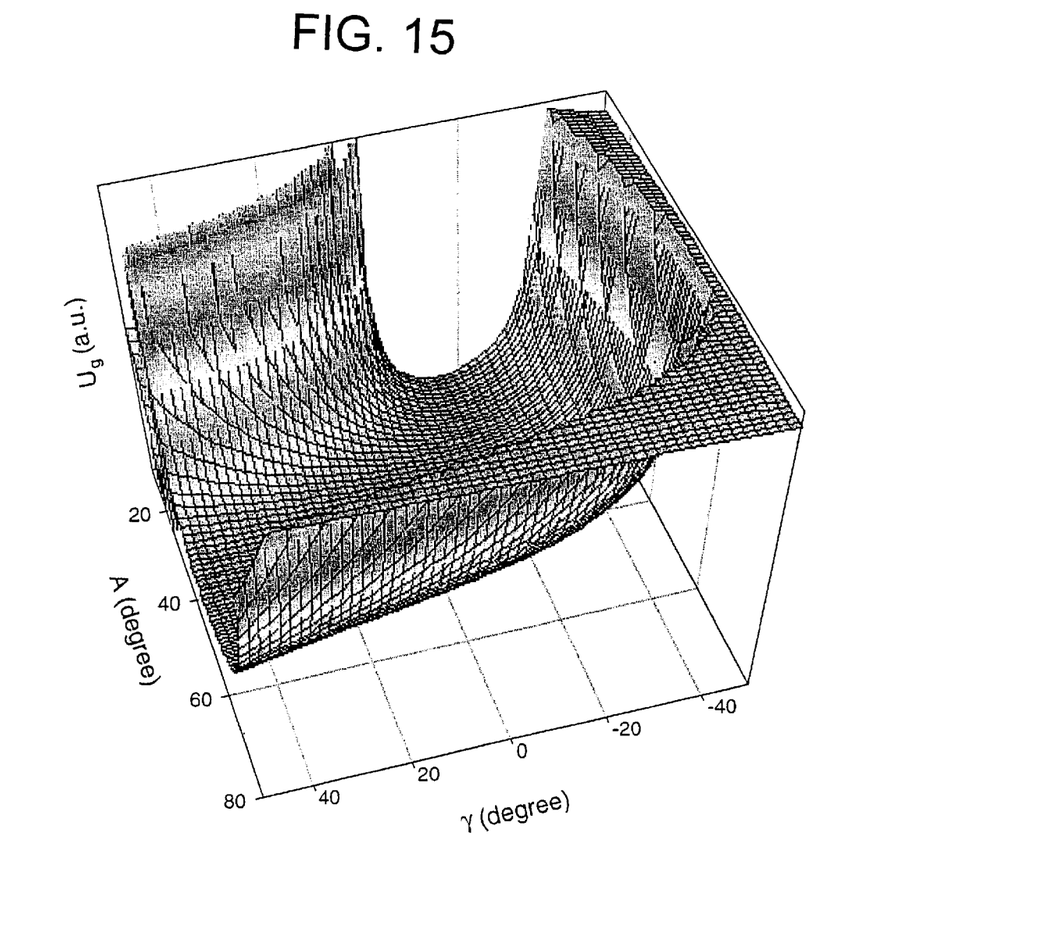
FIG. 15 is a three-dimensional plot of the unguided distance through the LC prism shown in FIG. 14 as a function of angle A and angle γ.

The results for unguided distance $U_g$ as a function of A and $\gamma$ are shown in FIG. 15. As apparent from viewing FIG. 15, there are many designs available with low unguided distance.

Figure 16:
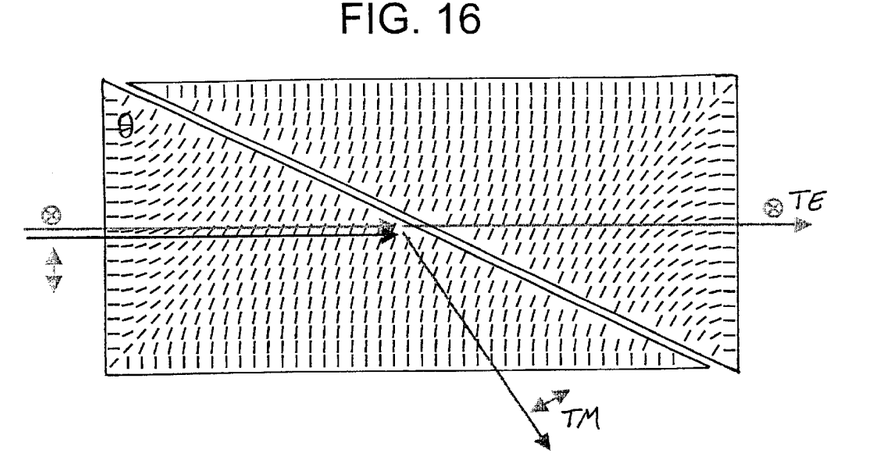
FIG. 16 is a top view of an optical element including dual triangular LC prisms shown in a state with no electric field applied.
Figure 17:
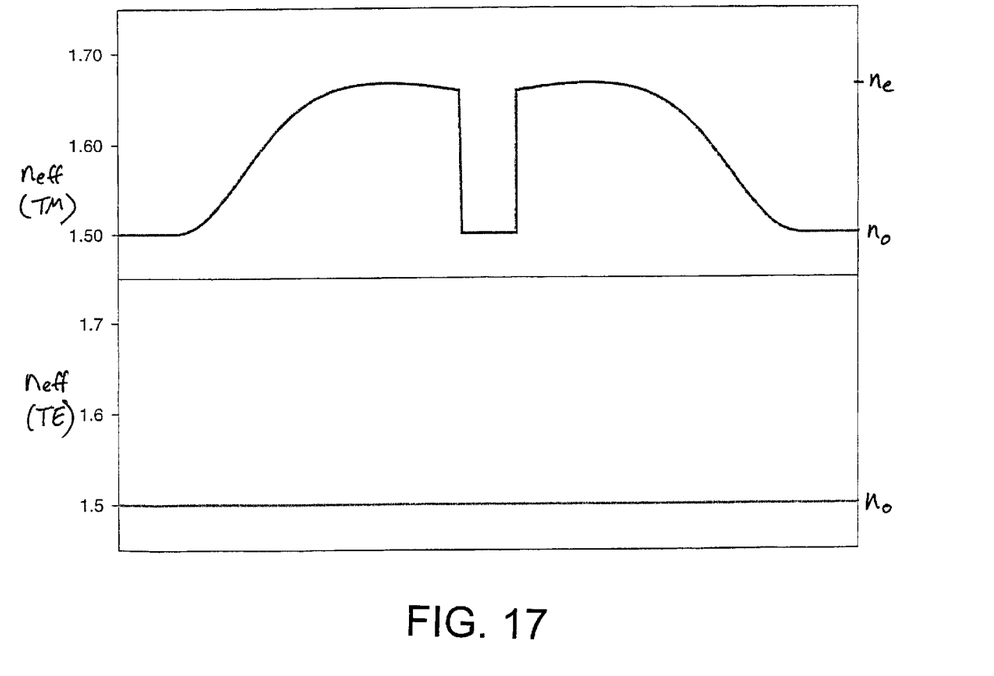
FIG. 17 is a graph illustrating the effective refractive index $n_{eff}$ as seen by the TM and TE light propagating through the optical element shown in FIG. 16.

If the refractive index $n_c$ of the waveguides matches the ordinary refractive index $n_o$ of the LC prism, there would be no refraction at the exit surface of the LC prism. However, if these two refractive indices are not matched, compensation for such refraction may be made by utilizing a dual prism design. FIG. 16 shows a polarization splitter constructed using two triangular LC prisms in accordance with one embodiment of the present invention. In FIG. 16, the two LC prisms are shown in a state whereby no electric field is applied. In this state, the TM wave is reflected and the TE wave passes straight through both LC prisms. FIG. 17 shows the effective refractive indices as seen by the TE and TM waves as they pass through the structure shown in FIG. 16. As illustrated, the effective index $n_{eff}$ as seen by the incident TM light gradually varies.

Figure 18:
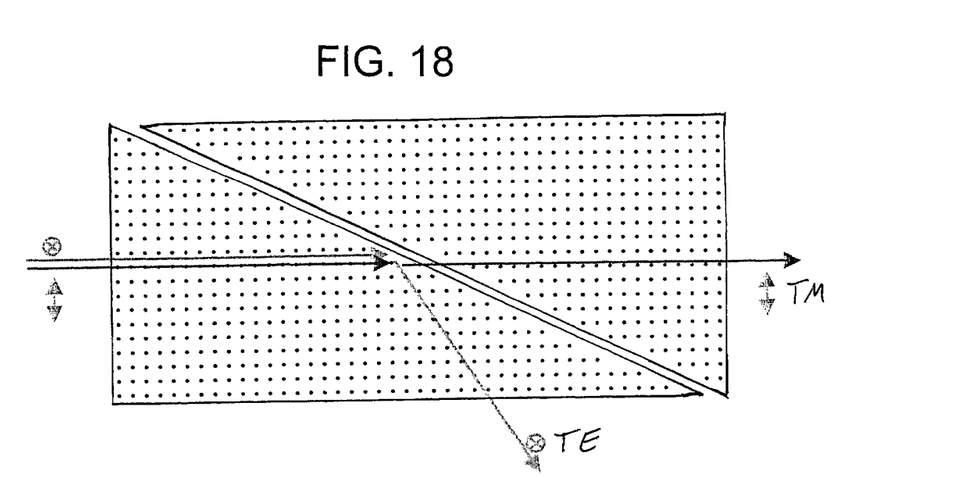
FIG. 18 is a top view of an optical element including dual triangular LC prisms shown in a state with an electric field applied.
Figure 19:
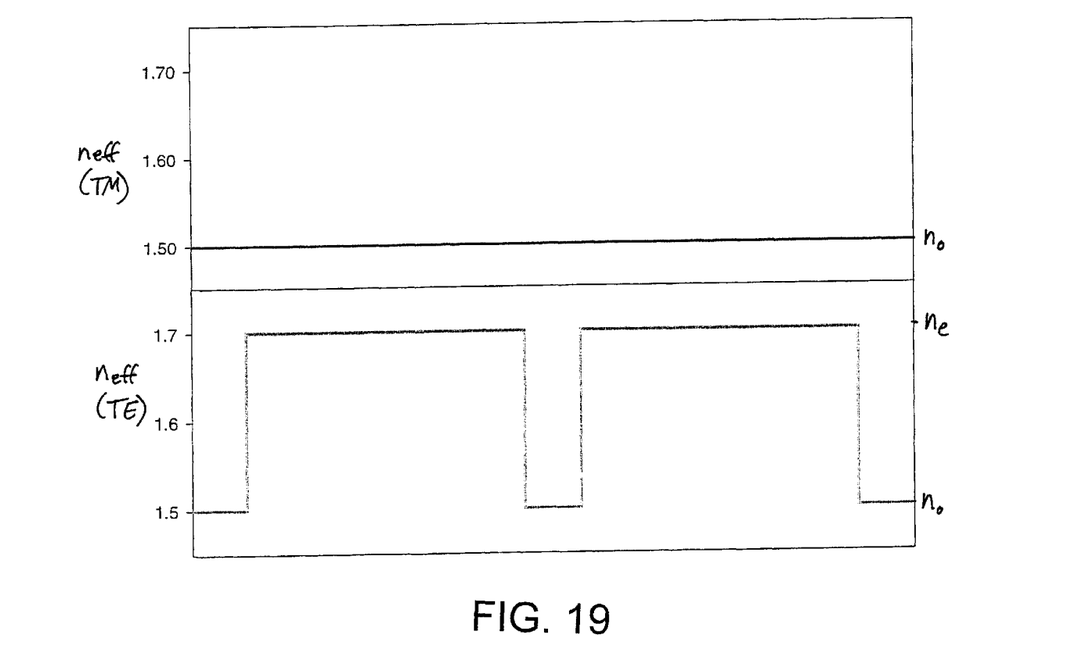
FIG. 19 is a graph illustrating the effective refractive index $n_{eff}$ as seen by the TM and TE light propagating through the optical element shown in FIG. 16.

When in an active state with an electric field applied, the dual prism design would function as illustrated in FIG. 18. The effective refractive indices as seen by the TM and TE light is illustrated in FIG. 19. As illustrated, the TE light is reflected while the TM light passes through both LC prisms.

Figure 20:
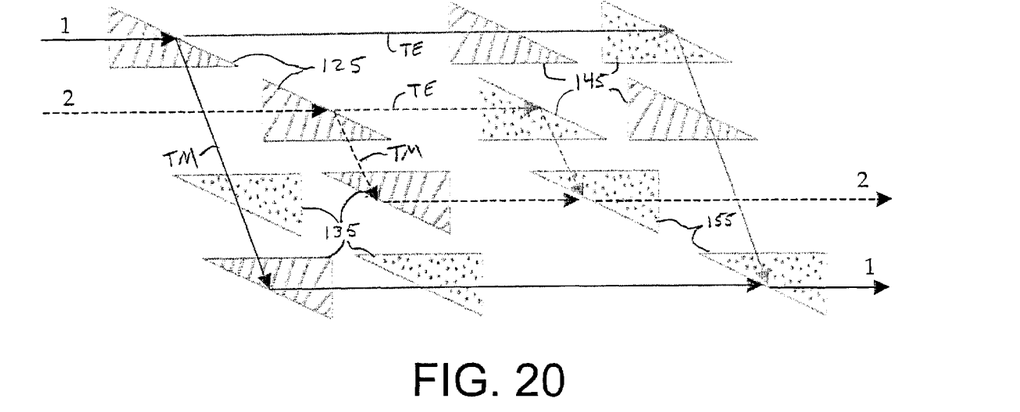
FIG. 20 is a top view of a 2×2 cross-connect constructed in accordance with one embodiment of the present invention.
Figure 21:
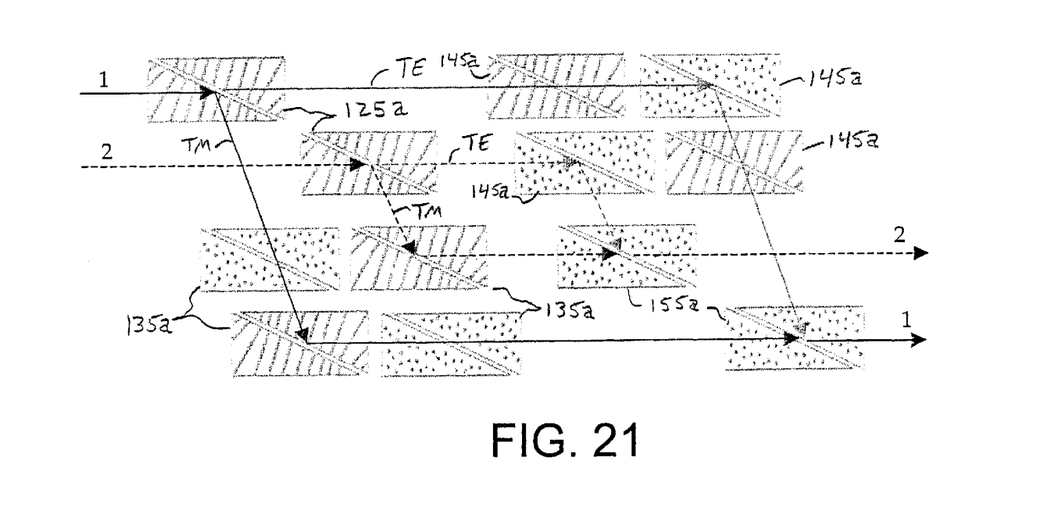
FIG. 21 is a top view of a 2×2 cross-connect constructed in accordance with another embodiment of the present invention.

To illustrate the use of the dual LC prism construction, a 2×2 cross-connect using a single prism construction is shown in FIG. 20 while a similar 2×2 cross-connect using a dual prism construction is illustrated in FIG. 21. As shown, the polarization splitters 125 and 125a in these respective cross-connects perform the same functions when in the same states. Similarly, TM switching elements 135 and 135a, TE switching elements 145 and 145a, and polarization combiners 155 and 155a perform the same respective functions.

Figure 22:
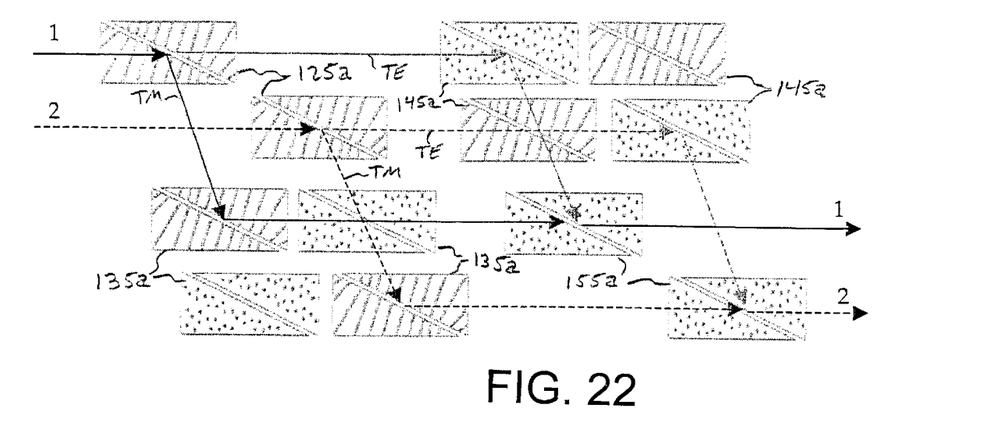
FIG. 22 is a top view of the 2×2 cross-connect shown in FIG. 21 in which the states of various LC prism TE and TM switches are changed to thereby switch the light signals that are applied to the output waveguides.

FIG. 22 illustrates the manner in which a 2×2 cross-connect switch can be controlled to change the output waveguides to which a pair of input light signals are directed. This function is performed by changing the states of the various TM and TE switching elements 145a and 135a as apparent from a comparison of FIGS. 21 and 22.

Figure 23:
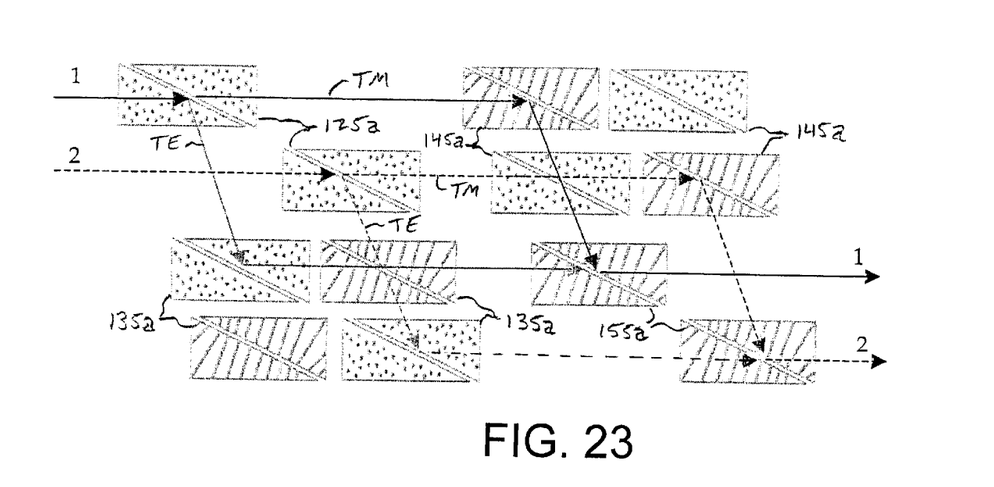
FIG. 23 is a top view of the 2×2 cross-connect shown in FIGS. 21 and 22 with the states of the polarization splitters and polarization combiners changed.

FIG. 23 illustrates the manner in which the 2×2 cross-connect shown in FIGS. 21 and 22 would operate when the states are changed for polarization splitters 125a and polarization combiners 155a. As illustrated, the TM light is transmitted by polarization splitters 125a to switching elements 145a whereas the TE light is directed towards switching elements 135a. The TM and TE light is nevertheless combined in a similar fashion and the light signals are transmitted through the same respective output waveguides as in FIG. 22.

Figure 24:
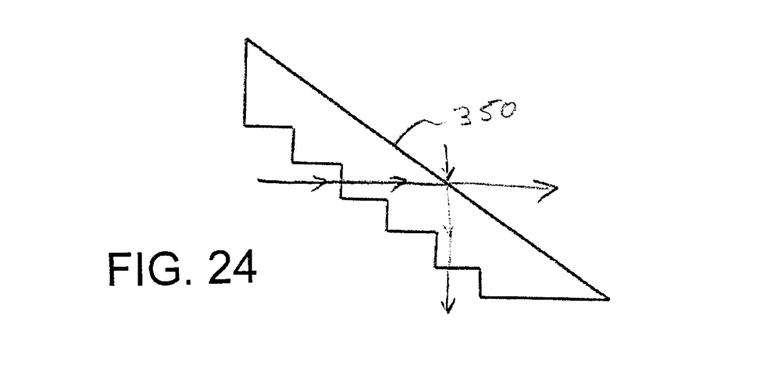
FIG. 24 is a top view of an LC prism constructed in accordance with a third embodiment of the present invention.

FIG. 24 illustrates an alternative construction for an LC prism that may be used in the cross-connect of the present invention. As illustrated, LC prism 350 has a construction similar to a triangle with the exception that the two legs of the triangles are replaced with a "stair" design. LC prism 350 nevertheless functions in a similar manner to the triangular shaped LC prism, but has the advantage that the unguided distance through LC prism 350 is significantly less than that in a triangular prism. It will be appreciated by those skilled in the art that other geometries may be utilized for the LC prisms of the present invention. For example, other truncated triangles may be used as may a trapezoidal construction.

It should also be noted that the entry and exit surfaces of the LC prism need not necessarily be flat. For example, the surfaces of the LC prism may be non-planar and hence more complex so as to focus the light as it exits or enters the LC prism or otherwise filter the light as it exits or enters the prism.

The planar cross-connect of the present invention is compact, less complex, and low cost. Moreover, the device is scaleable to large arrays. Electrical compensation and/or different LC materials can be used to improve crosstalk and compensate for thermal effects. Thus, an N×N non-blocking cross-connect based on LC and planar waveguide technologies has been described. An N×M cross-connect system is also within the scope of the present invention. The technology is scalable, compact, and low cost. Additionally, the LC trenches can be electrically compensated for thermal effects to insure low crosstalk.

In addition to switching, the LC trench can act as a partial reflector of the TE or TM wave in a variable optical attenuator and a variable broadcast element. A voltage range exists between the transmitting and total internal reflection states in which the LC molecules do not fully rotate to align with the electric field. In this case, the beam is partially transmitting and partially reflecting.

It will become apparent to those skilled in the art that various modifications to the preferred embodiment of the invention as described herein can be made without departing from the spirit or scope of the invention as defined by the appended claims.

What is claimed is:

1. An optical cross-connect switch comprising:
   a substrate;
   a plurality of optical waveguides provided on said substrate, wherein each of said waveguides intersects at least another one of said waveguides;
   a plurality of liquid crystal prisms each disposed on said substrate at a position where a pair of said waveguides intersect, said liquid crystal prisms selectively redirect a light signal propagating through one of the pair of intersecting waveguides to the other of the pair of intersecting waveguides in response to an electrical signal;
   an input port for receiving light;
   a polarization splitter to split the received light into TM and TE components;
   a TM switch array connected to receive the TM components from the polarization splitter though a first set of said optical waveguides;
   a TE switch array connected to receive the TE components from the polarization splitter through a second set of said optical waveguides;
   a polarization combiner coupled to the TM switch array through a third set of said optical waveguides and to the TE switch array through a fourth set of said optical waveguides to combine the outputs of the TM switch array and the TE switch array; and
   an output port coupled to the polarization combiner, wherein said liquid crystal prisms are disposed within at least one of said polarization splitter, polarization combiner, TM switch, and TE switch.

2. The optical cross-connect switch of claim 1, wherein each of the polarization splitter, the TM switch array, the TE switch array, and the polarization combiner includes at least one of said liquid crystal prisms.

3. An optical cross-connect switch comprising:
a substrate;
a plurality of optical waveguides provided on said substrate, wherein each of said waveguides intersects at least another one of said waveguides; and
a plurality of liquid crystal prisms each disposed on said substrate at a position where a pair of said waveguides intersect, said liquid crystal prisms selectively redirect a light signal propagating through one of the pair of intersecting waveguides to the other of the pair of intersecting waveguides in response to an electrical signal,
wherein each of said liquid crystal prisms comprises:
at least one first electrode disposed on the substrate;
a first cladding layer disposed on the first electrode;
a core layer disposed on the first cladding layer;
a second cladding layer disposed on the core layer;
a trench formed in the first cladding layer, the core layer, and the second cladding layer;
a first alignment layer disposed in the trench and on the second cladding layer;
a liquid crystal layer disposed on the first alignment layer;
a second alignment layer disposed on the liquid crystal layer; and
a top plate layer disposed above the second alignment layer.

4. The optical cross-connect switch of claim 3, wherein said top plate layer comprises a second electrode disposed above the second alignment layer above the trench and above a portion of the liquid crystal layer over the second cladding layer; and a cover glass disposed above the second electrode and the second alignment layer.

5. The optical cross-connect switch of claim 4, wherein said first electrode is a grounding electrode and said second electrode is an address electrode.

6. An optical device for directing a light signal comprising:
a substrate;
an optical waveguide disposed on said substrate;
at least one first electrode disposed between said substrate and said optical waveguide;
a liquid crystal prism formed in said optical waveguide; and
a top plate connected to said substrate,
wherein said liquid crystal prism has a shape defined by a trench formed in said optical waveguide, the trench having a surface area, and said liquid crystal prism includes a liquid crystal material disposed in said trench.

7. The optical device of claim 6 and further including a first alignment layer disposed on the surface area of said prismatic trench.

8. The optical device of claim 7 and further including a second alignment layer disposed on said top plate and adjacent to said liquid crystal material.

9. The optical device of claim 6, wherein said liquid crystal material comprises at least one of a nematic class liquid crystal material and a ferroelectric class liquid crystal material.

10. The optical device of claim 6, wherein the optical device is disposed within one of a polarization splitter, a polarization combiner, a TM switch, a TE switch, a variable optical attenuator, a signal splitter, and an N×N TE-TM array.

11. A dynamically adjustable optical prism comprising:
a prismatic-shaped structure having an input surface for receiving a light signal, two output surfaces, and two opposed surfaces, said prismatic-shaped structure including a dynamic material disposed between said surfaces that changes optical states in response to an electrical signal to selectively direct the received light signal to exit through one of said two output surfaces; and
a pair of electrodes each disposed on a different one of said two opposed surfaces for applying the electrical signal to the dynamic material,
wherein said prismatic-shaped structure is formed as a trench in a substrate having an optical waveguide disposed thereon, the trench having a surface area;
a first one of said pair of electrodes is disposed between the substrate and the optical waveguide;
said prismatic-shaped structure includes a first alignment layer disposed on the surface area of the trench, a liquid crystal material disposed in the trench and covering said first alignment layer, a top plate connected to the substrate, and a second alignment layer disposed on said top plate and adjacent to said liquid crystal material.

12. The optical device of claim 11, wherein said top plate includes a cover glass connected to the substrate, and a second one of said pair of electrodes disposed between said cover glass and said second alignment layer.

13. An optical device for directing a light signal comprising:
an optical waveguide;
a liquid crystal element formed in said optical waveguide, said liquid crystal element having an ordinary refractive index that is substantially equal to the refractive index of said optical waveguide and having an extraordinary refractive index that is greater than the refractive index of said optical waveguide; and
a substrate having said optical waveguide disposed thereon, wherein said liquid crystal element includes:
at least one first electrode disposed between said substrate and said optical waveguide;
a trench formed in said optical waveguide, said trench having a surface area;
a first alignment layer disposed on the surface area of said trench;
a liquid crystal material disposed in said trench and covering said first alignment layer;
a top plate connected to said substrate; and
a second alignment layer disposed on the top plate and adjacent to said liquid crystal material.

14. The optical device of claim 13, wherein said top plate comprises:
a cover glass connected to said substrate; and
a second electrode disposed between said cover glass and said second alignment layer.

15. An optical cross-connect switch comprising:
a substrate;
a plurality of optical waveguides provided on said substrate, wherein each of said waveguides intersects at least another one of said waveguides;

a plurality of liquid crystal prisms each disposed on said substrate at a position where a pair of said waveguides intersect, said liquid crystal prisms selectively redirect a light signal propagating through one of the pair of intersecting waveguides to the other of the pair of intersecting waveguides in response to an electrical signal;

an input port for receiving light;

a polarization splitter to split the received light into TM and TE components;

a switch array connected to receive the TM and TE components from the polarization splitter;

a polarization combiner coupled to the switch array to combine the TE and TM outputs of the switch array; and an output port coupled to the polarization combiner, wherein said liquid crystal prisms are disposed within at least one of said polarization splitter, said polarization combiner, and said switch array.

* * * * *